US 8,574,041 B1
Nov. 5, 2013

(12) United States Patent
Allain

(54) SHRIMP DEHEADING STATION

(71) Applicant: Reid P. Allain, Gulfport, MS (US)

(72) Inventor: Reid P. Allain, Gulfport, MS (US)

(*) Notice: Subject to any disclaimer, the term of this patent is extended or adjusted under 35 U.S.C. 154(b) by 0 days.

(21) Appl. No.: 13/762,126

(22) Filed: Feb. 7, 2013

(51) Int. Cl.
*A22C 29/02* (2006.01)

(52) U.S. Cl.
USPC .......................................... 452/4

(58) Field of Classification Search
USPC ................................. 452/1–6, 8–10
See application file for complete search history.

(56) References Cited

U.S. PATENT DOCUMENTS

| | | | | |
|---|---|---|---|---|
| 4,507,825 A * | 4/1985 | Betts et al. | | 452/2 |
| 4,745,660 A * | 5/1988 | Betts et al. | | 452/3 |
| 5,488,576 A * | 1/1996 | Main | | 708/300 |
| 5,762,547 A * | 6/1998 | Allain | | 452/179 |
| 5,839,952 A * | 11/1998 | Pollingue | | 452/8 |
| 6,200,209 B1 * | 3/2001 | Shelton | | 452/3 |
| 6,533,651 B2 * | 3/2003 | Keith | | 452/3 |
| 8,177,609 B2 * | 5/2012 | Andersen | | 452/1 |

* cited by examiner

*Primary Examiner* — Richard Price, Jr.
(74) *Attorney, Agent, or Firm* — George L Williamson

(57) ABSTRACT

Method and apparatus for deheading shrimp wherein are oriented head first in an entrance groove abutting a stop bar so that a head clamping bar can capture the shrimp between the head clamping bar and the bottom of the entrance groove near the sixth thoracic section so that cutting blades can sever the head from the shrimp. The heads of the shrimp are then deposited onto the head exit plate and the tails of the shrimp are then flushed from the entrance groove into an underlying tail exit trough by a stream of water. Thereafter a succeeding shrimp disposed in the entrance groove is then positioned in the entrance groove and the process repeated so that shrimp can be deheaded in an efficient manner.

16 Claims, 7 Drawing Sheets

SHRIMP DEHEADING STATION

BACKGROUND OF THE INVENTION

1. Field of the Invention

The present invention relates generally to shrimp processing equipment and, more particularly, is concerned with a shrimp deheading station.

2. Description of the Related Art

Shrimp deheaders have been described in the related art, however, none of the related art devices disclose the unique features of the present invention.

In U.S. Pat. No. 5,762,547 dated Jun. 9, 1998, Allain disclosed an apparatus for processing shrimp.

While these shrimp deheaders may be suitable for the purposes for which they were designed, they would not be as suitable for the purposes of the present invention as hereinafter described.

SUMMARY OF THE PRESENT INVENTION

The present invention discloses a shrimp deheading station wherein the shrimp are oriented in a head first position in an entrance groove wherein the head abuts the stop bar so that a head clamping bar can capture the shrimp between the head clamping bar and the bottom of the entrance groove so that the shrimp is contacted by the head clamping bar in the vicinity of the sixth thoracic section in such a way that a pair of horizontally reciprocating downwardly extending cutting blades can sever the head from the shrimp. The cutting blades are downwardly disposed from the cutting blade plate which are disposed on multiple blocks which are each operated by a push/pull pneumatic cylinder mounted on a pair of parallel bars which bars are attached to a rotatable swing axle so that the cutting blades are rotatable and are rotated by a pneumatic swing air cylinder which rotate the cutting blades away from the body of the shrimp after the cutting blades sever the head of the shrimp. The heads of the shrimp are then deposited onto the head exit plate and the tails of the shrimp are then flushed from the entrance groove into an underlying tail exit trough by a stream of water. Thereafter a succeeding shrimp disposed in the entrance groove is then positioned in the entrance groove and the process repeated so that shrimp can be deheaded in an efficient manner.

An object of the present invention is to provide an automatic shrimp deheading station. A further object of the present invention is to provide a shrimp deheading station which is efficient in that a large percentage of the meat on the shrimp is captured by the deheading station and thereby preserved for later processing. A further object of the present invention is to provide a shrimp deheading station which is easy to operate. A further object of the present invention is to provide a shrimp deheading station which is relatively inexpensively manufactured.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
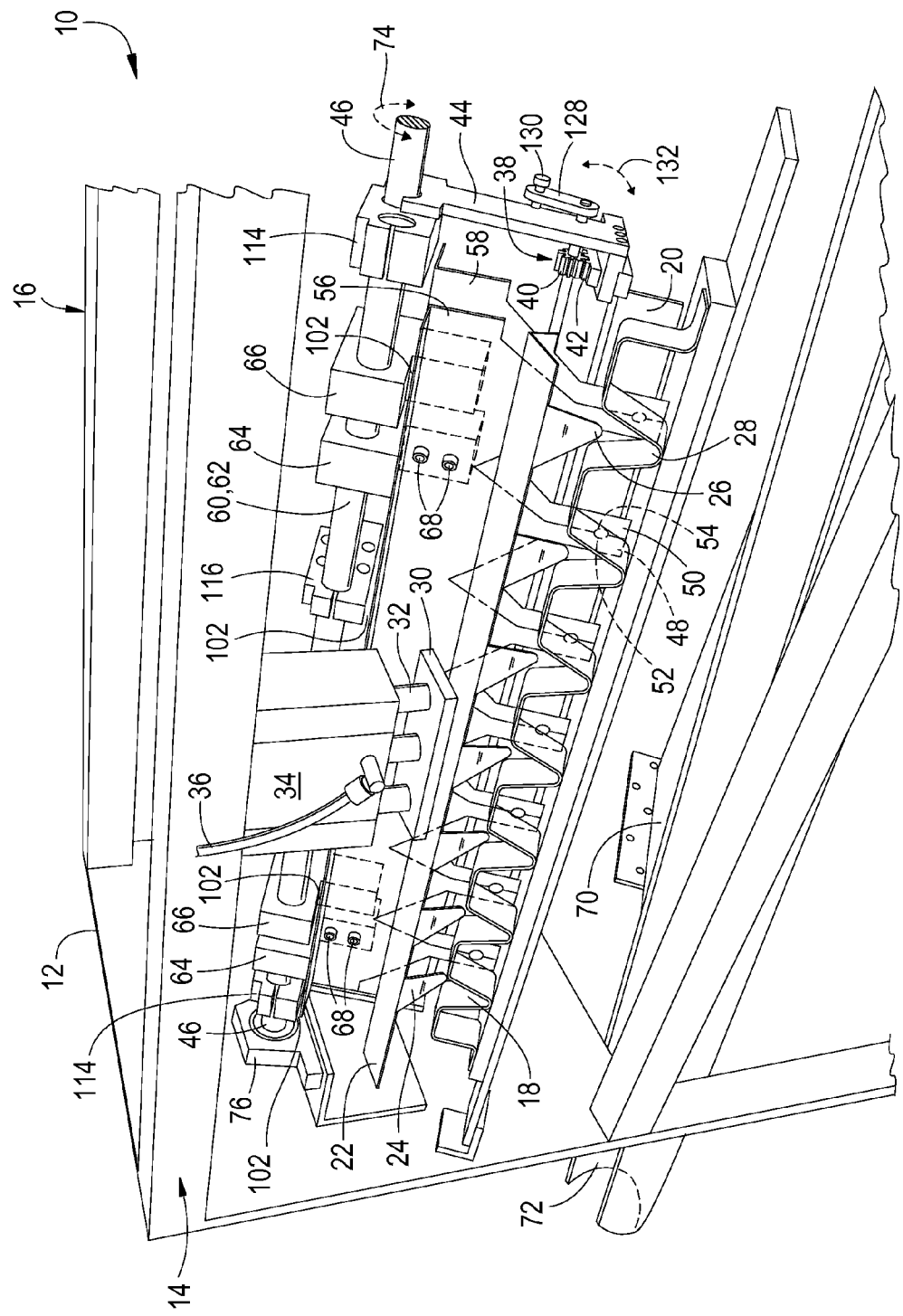
FIG. 1 is a front perspective view of the present invention.

With regard to reference numerals used, the following numbering is used throughout the drawings.

10 present invention
12 housing
14 front
16 rear
18 entrance groove
20 stop bar
22 head clamping bar
24 finger
26 tip of finger
28 bottom of groove
30 bottom plate
32 arm
34 air cylinder
36 air supply
38 rack and pinion gear assembly
40 gear
42 rack
44 arm
46 swing axle
48 cutting blade
50 cutting blade
52 notch
54 notch
56 cutting blade plate
58 cutting blade plate
60 parallel bar
62 parallel bar
64 block
66 block
68 nut and bolt
69 nut and bolt
70 head exit plate
72 tail exit trough 74 direction arrow
76 bearing block
77 direction arrow
78 swing cylinder assembly
80 shrimp
82 head of shrimp
83 body meat/picon
84 tail portion of shrimp
85 dorsal side
86 sixth thoracic section of shrimp
88 removed shrimp head
89 removed shrimp tail
90 air cylinder
91 air cylinder
92 rod
93 air cylinder
94 pivot connector
96 arm
98 ridge
100 valley
102 space
104 shrimp queue
106 orientation/singulation equipment
108 bottom
110 groove
112 leg
114 end block
116 cylinder block
118 rod
120 yoke
124 hole
126 hole
128 arm
130 knob
132 arrow
134 nozzle
136 jet of water

DETAILED DESCRIPTION OF THE PREFERRED EMBODIMENT

The following discussion describes in detail at least one embodiment of the present invention. This discussion should not be construed, however, as limiting the present invention to the particular embodiments described herein since practitioners skilled in the art will recognize numerous other embodiments as well. For a definition of the complete scope of the invention the reader is directed to the appended claims. FIGS. 1 through 10 illustrate the present invention wherein a shrimp deheading station is disclosed.

Figure 6:
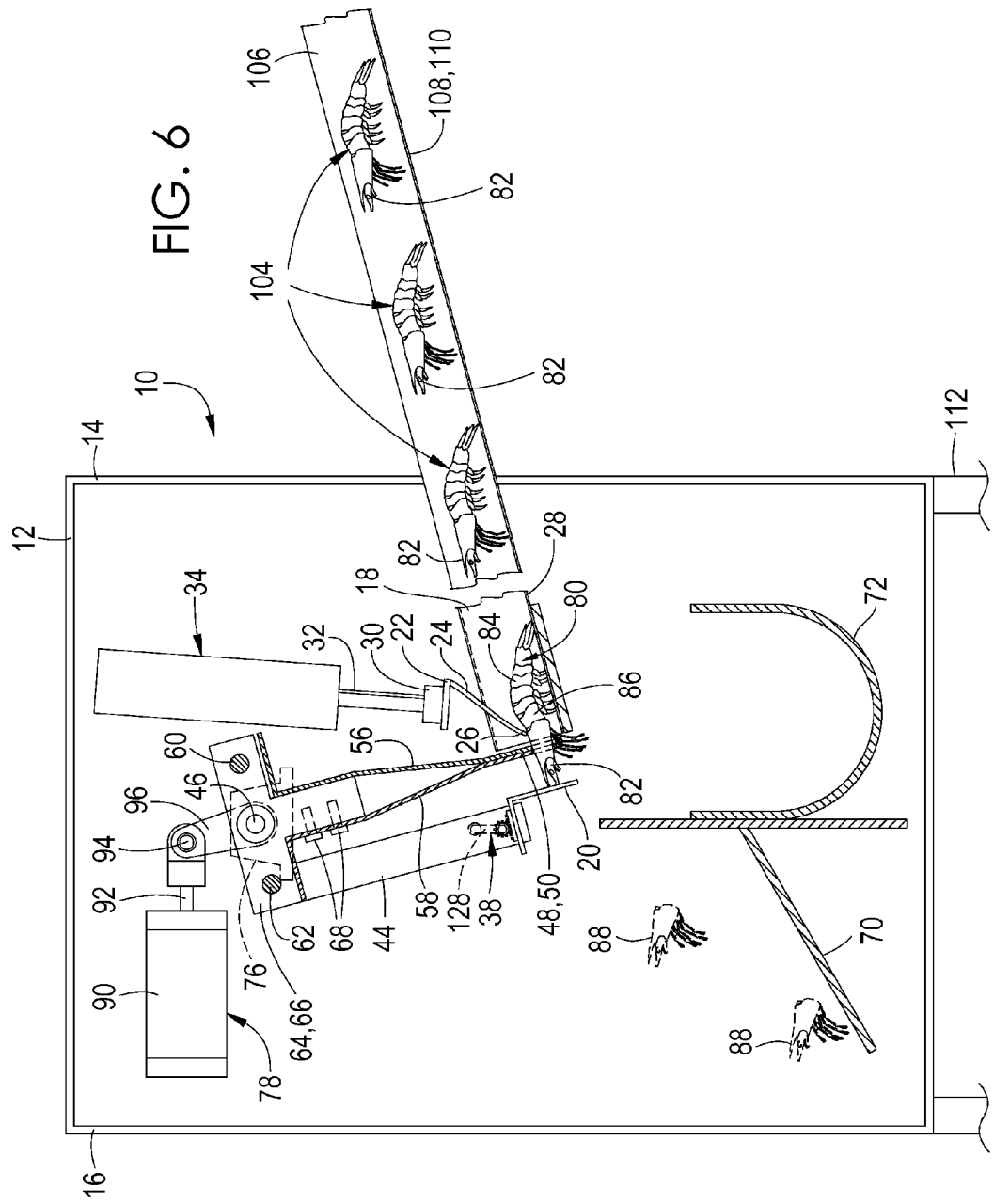
FIG. 6 is a side view of the present invention.

By way of general explanation, a shrimp processing plant would generally comprise the operations of (1) gathering the shrimp; (2) singulating the shrimp; (3) orienting the shrimp in a selected position; and (4) deheading the shrimp. The present invention relates only to the deheading step of the previously described processing operation. However, the outlet from a portion of the necessary processing equipment immediately preceding the present invention is shown in FIG. 6 at 106 showing the shrimp 104 queue after they have been singulated and oriented so that they are prepared for entry into the present invention.

Turning to FIG. 1, therein is shown the present invention 10 comprising a shrimp deheading station which station may be mounted on a framework or housing 12 and the housing may be mounted to the facility in a stationary position or could be portable so that the housing and the deheading station contained therein could be moved about the facility. The front of the deheading station is generally shown at 14 and the rear of the deheading station is generally shown as 16. On the front of the deheading station is shown a plurality of downwardly sloping, i.e., from front 14 to rear 16, entrance grooves 18 which grooves would have a plurality of shrimp queried which have already been gathered, singulated and oriented in the selected position (see FIG. 6, item 104) being positioned head first in the bottom 28 of the substantially V-shaped grooves 18. The entrance groove 18 would follow some sort of shrimp orientation equipment (not shown) which would position the shrimp so that the head of the shrimp lies in the bottom of the V-shaped groove so that the head is oriented toward the rear of the machine and the tail of the shrimp is oriented toward the front of the machine. The shrimp body is moved downwardly along the groove until the head of the shrimp abuts the head stop bar 20 and thereafter the head clamping bar 22 is moved downwardly so that a plurality of downwardly disposed V-shaped fingers 24 mounted on the bottom side of the head clamping bar capture the shrimp so that the tip 26 of the finger 24 is disposed just in front of the sixth thoracic section of the shrimp and firmly and securely captures the shrimp between the tip 26 of the finger 24 and the bottom 28 of the V-shaped groove 18. The fingers 24 are complimentarily sized and shaped to conform to the grooves 18 so as to effectively capture the shrimp therein. The head clamping bar 22 is attached to the bottom of a plate 30 or the like mounted on the lower end of arms 32 of an air cylinder 34 so that when the means for moving or air cylinder 34 is activated by the air supplied by line 36 that the arms 32 move up or down in a vertical direction which thereby moves the plate 30, the head clamping bar 22 and the fingers 24 so as to capture the shrimp between the fingers 24 and the grooves 18. Air cylinder 34 is the first actuable element which provides means for moving the head clamping bar 22. The head clamping mechanism comprises the head clamping bar 22, the entrance grooves 18, and the adjustable head stop bar 20. In operation, the head clamping bar 22 is pneumatically operated by air cylinders 34 which move up and down and thereby captures the shrimp in the groove 18 because the shrimp's head is stopped by the stop bar 20. The head stop bar 20 is adjustable in the horizontal plane by a manually adjustable rack and pinion gear mechanism 38 so that the head stop bar 20 can be moved from front to rear in order to accommodate different sizes of shrimp by varying the distance between the head stop bar 20 and the rear of the groove 18. The rack and pinion gear 38 is a conventional unit comprising a gear member portion 40 and a mating rack member portion 42 wherein the gear portion is turned by an arm 128 having a knob or handle 130 thereon for being grasped by the hand of a user so it can be turned as indicated by direction arrow 132 and having the rack portion mounted on the stop bar 20 disposed underneath so that the stop bar 20 can be moved from front to rear of the deheading station as the arm 128 is turned. It can be seen that the gear assembly 38 is downwardly disposed on the left and right arms 44 from a rotatable or swing axle or bar 46 upon which the stop bar 20 and cutting blades 48, 50 are mounted so that those components can be swung or rotated (as shown by direction arrow 74) away from, i.e., toward the rear 16, the head clamping bar 22 so as to remove the head from the body of the shrimp. The cutting blades 48, 50 each have a generally half-moon shaped notch 52, 54 disposed therein so as to capture the head of the shrimp in between the pair of notches. Each cutting or severing blade 48, 50 is downwardly disposed from a cutting blade plates 56, 58 which are mounted on parallel bars 60, 62 by means of blocks 64, 66 so that the cutting blades 48, 50 can move in a horizontal plane in a reciprocating fashion. Also shown are a plurality of blocks 64, 66 mounted on the parallel bars 60, 62 as will be later explained. It can be seen that the front cutting arm plate 56 is attached to a lower portion of left and right blocks 64 by mounting nuts 68 on the left and right sides the front cutting arm plate. The rear cutting arm plate 58 is similarly attached on the rear 16 to a lower portion of left and right blocks 66 by mounting nuts (not shown) on the right side and left side of the rear cutting arm plate. Also shown are left and right end blocks 114 which are configured to connect the left and right swing axles 46 to each of the parallel bars 60, 62 along with a cylinder block 116 which will be further described hereinafter. Note the plurality of spaces 102 provided between the top surfaces of the front cutting arm plate 56 and the blocks 66, 102 and 114 which allow the front cutting arm plate to move left or right without contacting the blocks 66, 102 and 114. Also shown is a head exit plate 70 so that the heads are directed to the rear 16 of the mechanism along with a shrimp tail exit trough 72 so that the tail or edible meat portion of the shrimp can be washed from the entrance groove 18 by an unshown jet of water (see FIG. 8) and deposited into the tail exit trough 72 and carried to a receptacle.

Figure 2:
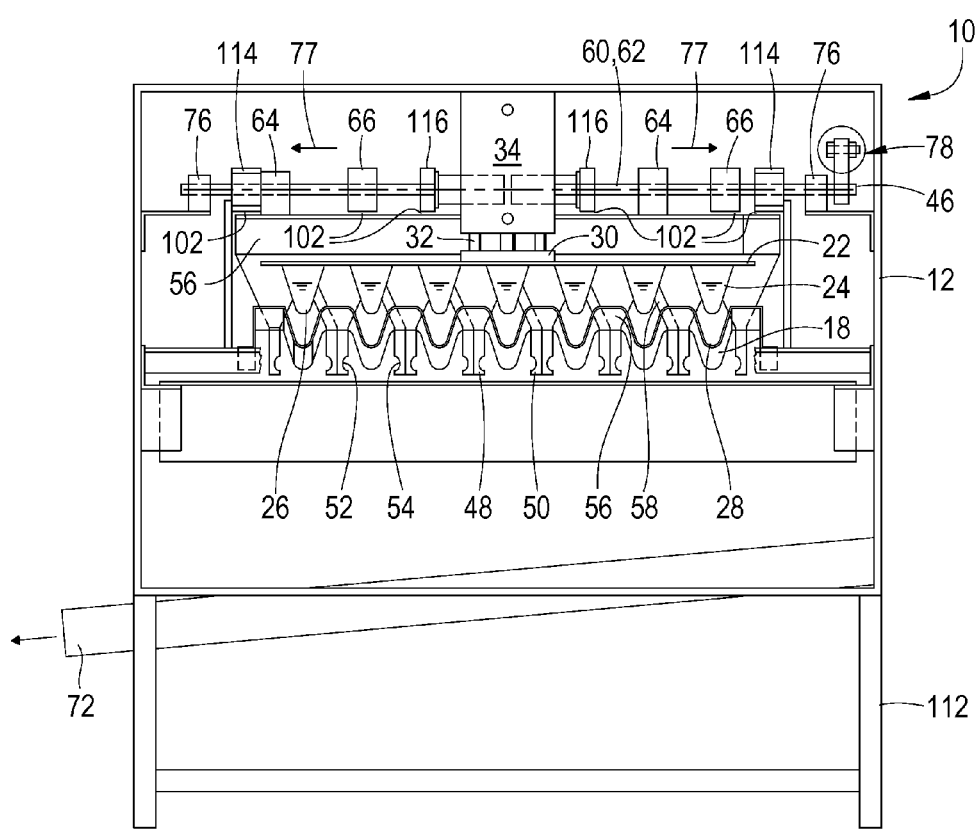
FIG. 2 is a front elevation view of the present invention with the blades open.

Turning to FIG. 2, therein is shown the present invention 10 mounted on a framework or housing 12 by one or more legs 112, the downwardly sloping entrance grooves 18 and the bottom 28 showing the cutting blades 48, 50 in the open position. Also shown are the plurality of downwardly disposed V-shaped fingers 24 mounted on the bottom side of the head clamping bar 22 to capture the shrimp so that the tip 26 of the finger 24 captures the shrimp between the tip 26 of the finger 24 and the bottom 28 of the V-shaped groove 18. The fingers 24 are complimentarily sized and shaped to conform to the grooves 18 so as to effectively capture the shrimp therein. The head clamping bar 22 is attached to the bottom of a plate 30 or the like mounted on the lower end of arms 32 of an air cylinder 34 so that when the air cylinder 34 is activated by the air supply the arms 32 move up or down in a vertical direction which thereby moves the plate 30, the head clamping bar 22 and the fingers 24 so as to capture the shrimp between the fingers 24 and the grooves 18. The cutting blades 48, 50 each have a generally half-moon shaped notch 52, 54 disposed therein so as to capture the head of the shrimp in between the pair of notches. Each blade 48, 50 is downwardly disposed from a cutting blade plates 56, 58 which are mounted on parallel bars 60, 62 (only the front bar 60 is shown) by means of blocks 64, 66 so that the cutting blades 48, 50 can move in a horizontal plane in a reciprocating fashion. The parallel bars 60, 62 are mounted on the rotary swing axle 46 having bearing blocks 76 on each end which are operated by a swing cylinder assembly being generally shown at 78. As previously shown in FIG. 1, the front cutting arm plate 56 is attached to a lower portion of left and right blocks 64. The rear cutting arm plate 58 is similarly attached on the rear to left and right blocks 66. Also shown are left and right end blocks 114 which are configured to connect the left and right swing axles 46 to each of the parallel bars 60, 62 along with left and right cylinder blocks 116. Note the plurality of spaces 102 provided between the top surfaces of the front cutting arm plate 56 and the blocks 66, 102 and 114 which allow the front cutting arm plate to move left or right without contacting the blocks 66, 102 and 114. Also shown is a tail exit trough 72. Direction arrows 77 show that blocks 64, 66 are moved away from each other on bars 60, 62 so that the blades 48, 50 move away from each other and thereby open.

Figure 3:
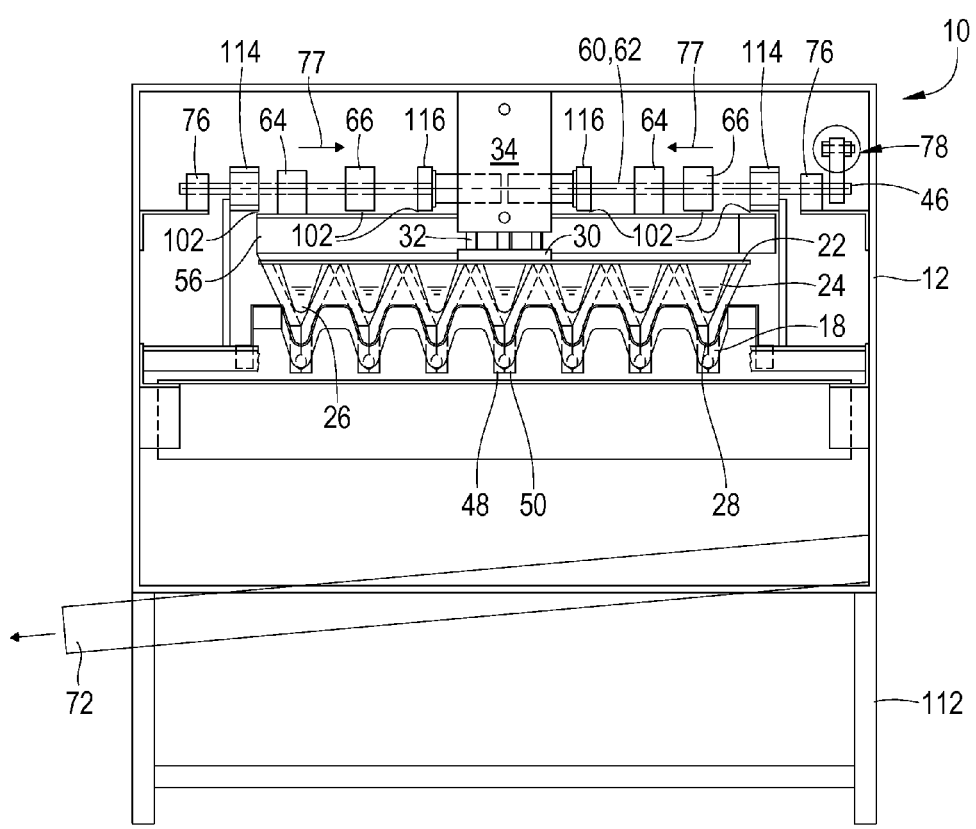
FIG. 3 is a front elevation view of the present invention with the blades closed.

Turning to FIG. 3, therein is shown the present invention 10 just as in FIG. 2 except that the cutting blades 48, 50 are shown closed. Direction arrows 77 show that blocks 64, 66 are moved toward each other on bars 60, 62 so that the blades 48, 50 move toward each other and thereby close.

Figure 4:
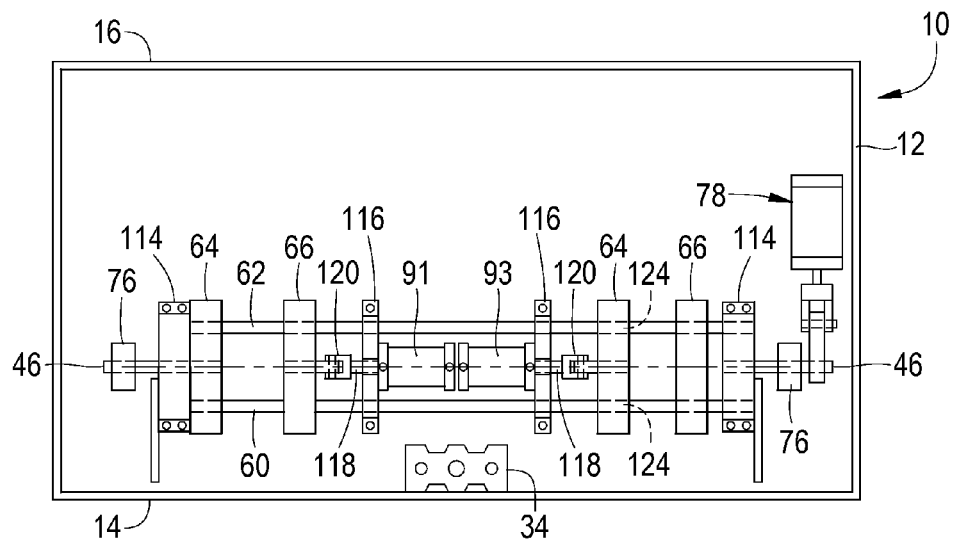
FIG. 4 is a top view of the present invention with the blades open.

Turning to FIG. 4, therein is shown the present invention 10 mounted on a framework or housing 12. As previously explained, each cutting blade 48, 50 (not shown, but see FIG. 1) is downwardly disposed from a cutting blade plates 56, 58 (not shown, but see FIG. 1) which are mounted on the front parallel bar 60 and the rear parallel bar 62 by means of blocks 64, 66 so that the cutting blades can move in a horizontal plane in a reciprocating fashion. The parallel bars 60, 62 are mounted on the rotary swing axle 46 having bearing blocks 76 on each end which are operated by a swing cylinder 78. Blocks 64, 66 operate simultaneously on parallel bars 60, 62 using a pair of conventional push-pull pneumatic air cylinders 91, 93 having an open position (rod extended) and a closed position (rod retracted) wherein the cutting blades 56, 58 (not shown, but see FIG. 1) are normally open, i.e., the air cylinders are normally in the closed or retracted position. Blocks 64, 66 are shown moved away from each other on bars 60, 62 so that the blades 48, 50 (not shown) move away from each other and thereby open. Also shown is the top of air cylinder 34. The front cutting arm plate 56 (not shown, see FIG. 1) is attached to a lower portion of left and right blocks 64 by mounting nuts 68 on the left and right sides the front cutting arm plate. The rear cutting arm plate 58 (not shown, see FIG. 1) is similarly attached on the rear 16 to a lower portion of left and right blocks 66 by mounting nuts (not shown) on the right side and left side of the rear cutting arm plate. Also shown are left and right end blocks 114 which are configured to connect the left and right swing axles 46 to each of the parallel bars 60, 62 along with left and right cylinder blocks 116 which assist in attaching the air cylinders 91, 93 to the framework 12. The right actuator or air cylinder 93 has a rod or arm 118 having a yoke 120 on the end thereof which yoke attached to the right block 64 so that when the air cylinder 93 is actuated the arm or rod 118 is extended so that the right block 64 moves to the right toward the right block 66 so as to move the front cutting blade plate 56 (not shown, see FIG. 1) to the right so as to close the cutting blades 48, 50 (not shown, see FIG. 1). The left actuator or air cylinder 91 has a rod or arm 118 having a yoke 120 on the end thereof which yoke attached to the left block 66 so that when the air cylinder 91 is actuated the arm or rod 118 is extended so that the left block 66 moves to the left toward the left block 64 so as to move the rear cutting blade plate 58 (not shown, see FIG. 1) to the left so as to close the cutting blades 48, 50 (not shown, see FIG. 1). It should be clear that each of the left and right blocks 64, 66 have horizontal holes 124 extending laterally therein so that the parallel bars 60, 62 can pass therethrough so that the blocks can move or slide along the parallel bars in response to the movement of the actuators 91, 93. The means for reciprocating the first and second severing blades 48, 50 (not shown, see FIG. 1) can be summarized as comprising the following: a) first and second parallel bars 60, 62, wherein each first and second parallel bar is adapted for connection to the rotatable axle 46; a first plate 56 (not shown, see FIG. 6) adapted for connection to the first and second parallel bar and a second plate 58 (not shown, see FIG. 6) adapted for connection to the first and second parallel bar; the first severing blade being disposed on the first plate and the second severing blade being disposed on the second plate; wherein the first plate is adapted for connection to a second actuating element 93 and the second plate is adapted for connection to a third actuating element 91; wherein the first and second severing blades are reciprocated relative to each other by the second and third actuating elements; and, wherein the rotatable axle is adapted for connection to a fourth actuating element 78 for rotating the rotatable axle. As a matter of clarification, note that the first actuating element, air cylinder 34, was previously described relative to FIG. 1.

Figure 5:
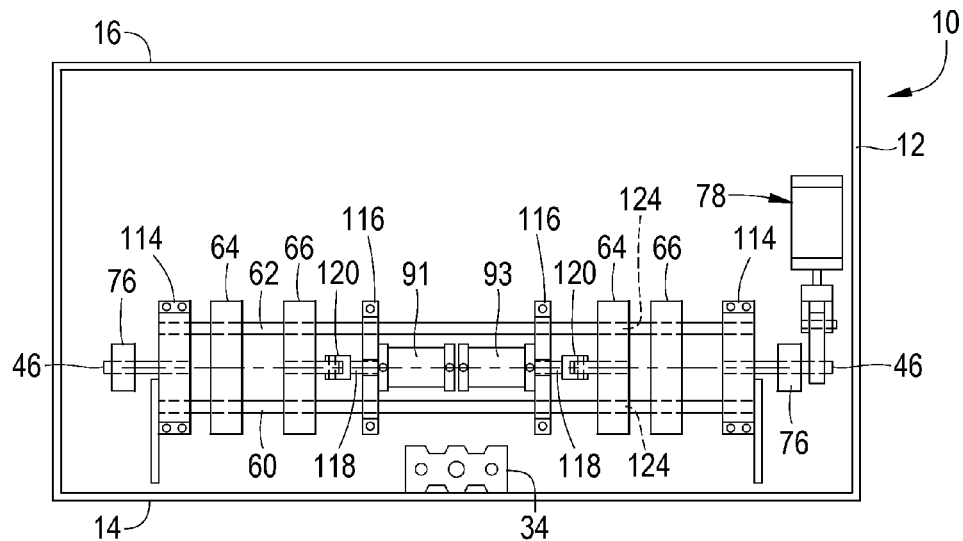
FIG. 5 is a top view of the present invention with the blades closed.

Turning to FIG. 5, therein is shown the present invention 10 just as in FIG. 4 except that the blocks 64, 66 are moved toward each other on bars 60, 62 so that the blades 48, 50 (not shown) move toward each other and thereby close.

Turning to FIG. 6, therein is shown the present invention 10 mounted on a framework or housing 12 showing front 14 and rear 16 and entrance grooves 18 showing one of a plurality of shrimp 80 queried in the bottom 28 of the substantially V-shaped grooves 18 so that the head 82 is oriented toward the rear of the machine and the tail 84 of the shrimp is oriented toward the front of the present invention 10. A plurality of shrimp generally shown at 80 are shown queried at 104 which shrimp have already been gathered, singulated and oriented in the selected head 82 forward, dorsal side 85 up position being shown at 104 in the vicinity of the outlet from a portion of the processing equipment 106 immediately preceding the present invention 10 showing the shrimp disposed on the bottom 108 of groove 110 which groove 110 cooperates with the groove 18 of the present invention showing shrimp which have been singulated and oriented so that they are prepared for entry into the present invention. Shrimp 80 which have been delivered by equipment 106 are positioned head first in the bottom 28 of the substantially V-shaped grooves 18. The shrimp 80 body is moved downwardly along the groove 18 until the head 82 of the shrimp abuts the head stop bar 20 and thereafter the head clamping bar 22 is moved downwardly so that a plurality of downwardly disposed V-shaped fingers 24 mounted on the bottom side of the head clamping bar capture the shrimp so that the tip 26 of the finger 24 is disposed just in front of the sixth thoracic section 86 of the shrimp and firmly and securely captures the shrimp between the tip 26 of the finger 24 and the bottom 28 of the V-shaped groove 18. The head clamping bar 22 is attached to the bottom of a plate 30 or the like mounted on the lower end of arms 32 of an air cylinder 34 so that when the air cylinder 34 is activated by the air supplied by a line that the arms 32 move up or down in a vertical direction which thereby moves the plate 30, the head clamping bar 22 and the fingers 24 so as to capture the shrimp between the fingers 24 and the grooves 18. The head stop bar 20 is adjustable in the substantially horizontal plane by a manually adjustable rack and pinion gear mechanism 38 so that the head stop bar 20 can be moved from front to rear in order to accommodate different sizes of shrimp by varying the distance between the head stop bar 20 and the rear of the groove 18. It can be seen that the gear assembly 38 is downwardly disposed on the left and right arms 44 from a rotatable or swing axle or bar 46 upon which the stop bar 20 and cutting blades 48, 50 are mounted so that those components can be swung or rotated away from, i.e., toward the rear 16, the head clamping bar 22 so as to remove the head from the body of the shrimp as shown by the falling removed heads 88. Each blade 48, 50 is downwardly disposed from a cutting blade plates 56, 58 which are mounted on parallel bars 60, 62 by means of blocks 64, 66 so that the cutting blades 48, 50 can move in a horizontal plane in a reciprocating fashion. Also shown are a plurality of blocks 64, 66 mounted on the parallel bars 60, 62 as previously explained. Rear cutting arm plate 58 is attached to a lower portion of block 66 by mounting nuts 68 on the right side and left side of the plate. The parallel bars 60, 62 are mounted on the rotary swing axle 46 having bearing blocks 76 on each end which are operated by a swing cylinder assembly 78 which comprises a conventional pneumatically operated cylinder 90, a reciprocating internal rod 92, a pivotable connector 94 adapted for connection to an arm 96 the arm having one end adapted for connection to connector 94 and the other end adapted for connection to axle 46. Also shown is a head exit plate 70 so that the heads 88 are directed to the rear 16 of the mechanism along with a shrimp tail exit trough 72 so that the tail or edible meat portion of the shrimp can be washed from the entrance groove 18 by an unshown jet of water and deposited into the tail exit trough 72 and carried to a receptacle.

Figure 7:
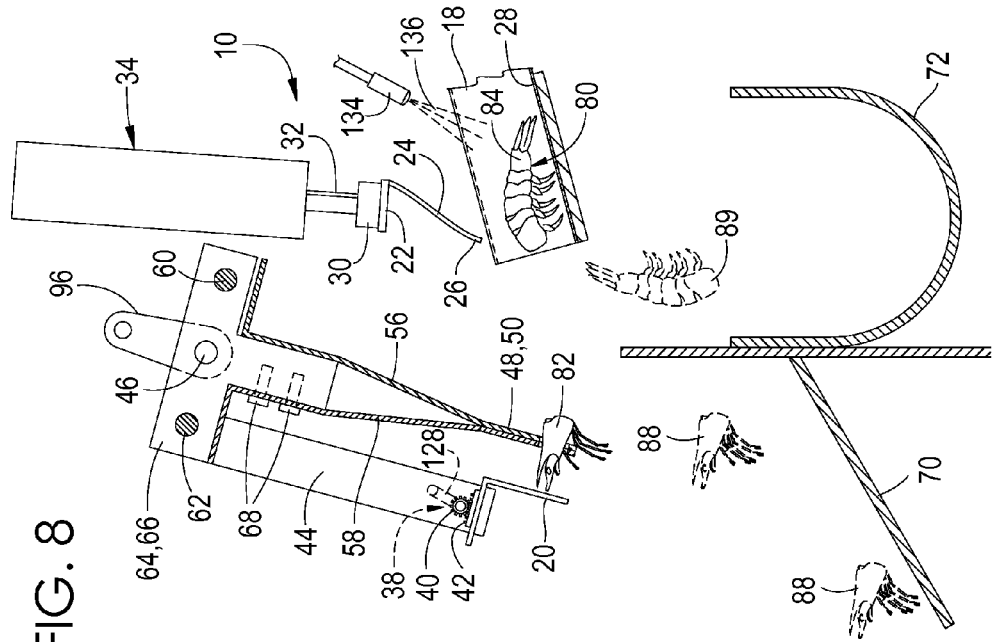
FIG. 7 is an elevation view of portions of the present invention.

Turning to FIG. 7, therein is shown portions of the present invention 10 showing entrance grooves 18 showing one of a plurality of shrimp 80 queried in the bottom 28 of the substantially V-shaped grooves 18 so that the head 82 is oriented toward the rear of the machine and the tail 84 of the shrimp is oriented toward the front of the present invention 10. The shrimp 80 body is moved downwardly along the groove 18 until the head 82 of the shrimp abuts the head stop bar 20 and thereafter the head clamping bar 22 is moved downwardly so that a plurality of downwardly disposed V-shaped fingers 24 mounted on the bottom side of the head clamping bar capture the shrimp so that the tip 26 of the finger 24 is disposed just in front of the sixth thoracic section 86 of the shrimp and firmly and securely captures the shrimp between the tip 26 of the finger 24 and the bottom 28 of the V-shaped groove 18. The head clamping bar 22 is attached to the bottom of a plate 30 or the like mounted on the lower end of arms 32 of an air cylinder 34 so that when the air cylinder 34 is activated by the air supplied by a line that the arms 32 move up or down in a vertical direction which thereby moves the plate 30, the head clamping bar 22 and the fingers 24 so as to capture the shrimp between the fingers 24 and the grooves 18.

The head stop bar 20 is adjustable in the substantially horizontal plane by a manually adjustable rack and pinion gear mechanism 38 so that the head stop bar 20 can be moved from front to rear in order to accommodate different sizes of shrimp by varying the distance between the head stop bar 20 and the rear of the groove 18. The rack and pinion gear 38 is a conventional unit comprising a gear member portion 40 and a mating rack member portion 42 having the stop bar 20 disposed underneath so that the stop bar 20 can be moved from front to rear of the deheading station. It can be seen that the gear assembly 38 is downwardly disposed on the left and right arms 44 from a swing axle or bar 46 upon which the stop bar 20 and cutting blades 48, 50 are mounted so that those components can be swung or rotated away from, i.e., toward the rear, the head clamping bar 22 so as to remove the head from the body of the shrimp as shown by the falling removed heads 88.

Each blade 48, 50 is downwardly disposed from a cutting blade plates 56, 58 which are mounted on parallel bars 60, 62 by means of blocks 64, 66 so that the cutting blades 48, 50 can move in a horizontal plane in a reciprocating fashion. Also shown are a plurality of blocks 64, 66 mounted on the parallel bars 60, 62 as previously explained. Rear cutting arm plate 58 is attached to a lower portion of block 66 by mounting nuts 68 on the right side and left side of the plate. Also shown is arm having one end adapted for connection to connector 94 (not shown, but see FIG. 6) and the other end adapted for connection to axle 46. Also shown is a head exit plate 70 so that the heads 88 are directed to the rear of the mechanism along with a shrimp tail exit trough 72 so that the tail or edible meat portion of the shrimp can be washed from the entrance groove 18 by an unshown jet of water and deposited into the tail exit trough 72 and carried to a receptacle.

Figure 8:
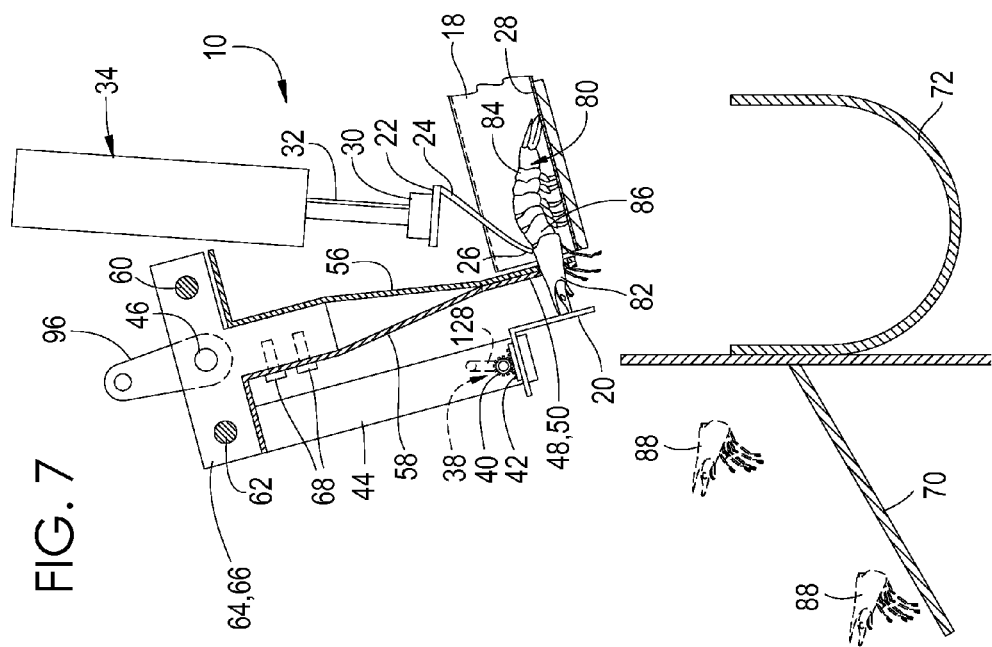
FIG. 8 is a side elevation view of portions of the present invention.

Turning to FIG. 8, therein is shown the present invention 10 just as in FIG. 7 except that the swing arm 46 has been rotated to the rear by the means for rotating so that the cutting blades 48, 50 move away from the entrance groove 18 so as to remove the head 82 from the shrimp 80 so that the previously removed tail 89 can be washed into the tail exit trough 72.

Also, the arm 32 has been raised upwardly away from the shrimp tail 84 remaining in the groove 18 so that shrimp tail 84 can then be freed to be washed into the trough 72. Also shown is a portion of a water jet nozzle 134 and the resulting jet 136 for washing the shrimp 80 into the exit trough 72.

Figure 9:
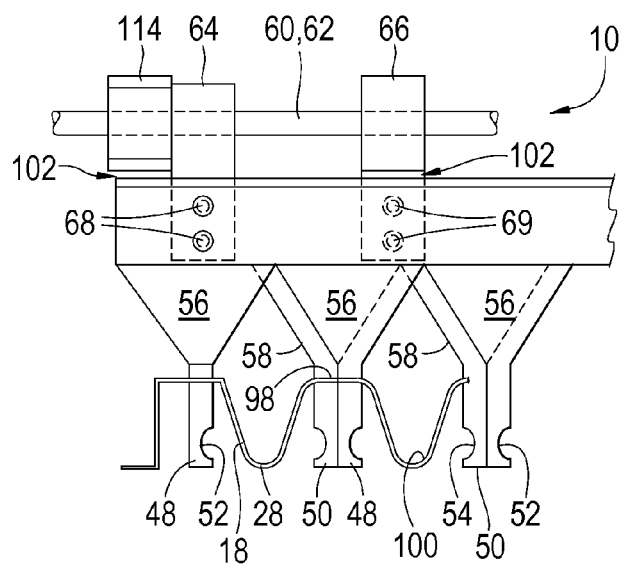
FIG. 9 is an elevation view of portions of the present invention with the blades open.

Turning to FIG. 9, therein is shown the cutting blade 48, 50 in an open configuration. The grooves 18 and bottom 28 are shown. It is expected that the grooves 18 will be made of one piece construction similar to a piece of conventional corrugated material having alternating ridges 98 and valleys 100. Blades 48, 50 are downwardly disposed from cutting blade plates 56, 58 with 56 being mounted toward the front and 58 being mounted toward the rear, plates 56 is mounted on the front parallel bar 60 by means of block 64 and plate 58 is mounted on the rear parallel bar 62 by means of blocks 66 so that the cutting blades can move in a horizontal plane in a reciprocating fashion. Blocks 64, 66 are shown moved away from each other on bars 60, 62 so that the blades 48, 50 move away from each other and thereby open. Front cutting blade plate 56 is attached to block 64 with nut and bolt 68 and the rear cutting blade plate 58 is attached to block 66 with nut and bolt 69. Note the space 102 between the top of plate 56 and the bottom of left end block 114 and the bottom of block 66 which allows block 66 to move without touching plate 56. Blocks 64, 66 are similarly shaped and are mounted on the bars 60, 62 in a reverse disposition as can also be seen in FIG. 1. Also shown is the bearing block 76 on the left side of the present invention as shown in FIG. 1. The cutting blades 48, 50 each have a generally half-moon shaped notch 52, 54 disposed therein so as to capture the head of the shrimp in between the pair of notches. Notches 52, 54 are complementarily sized and shaped to conform to the heads of the shrimp and they form a hole 126 that is positioned so as to cooperate with and be aligned with the bottom 28 (not shown, see FIG. 6) of the incoming entrance groove 18 (not shown, see FIG. 6) so as to effectively capture the heads 82 of the incoming shrimp 80 (not shown, see FIG. 1).

Figure 10:
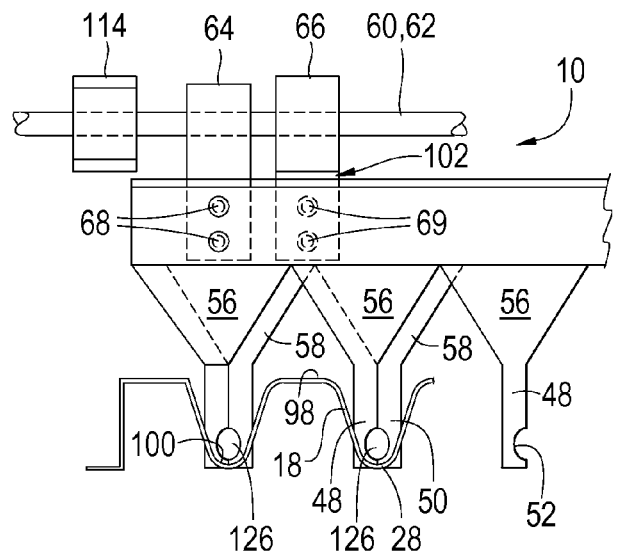
FIG. 10 is an elevation view of portions of the present invention with the blades closed.

Turning to FIG. 10, therein is shown the present invention 10 just as in FIG. 9 except that the blocks 64, 66 are moved toward each other on bars 60, 62 so that the blades 48, 50 move toward each other and thereby close.

Figure 11:
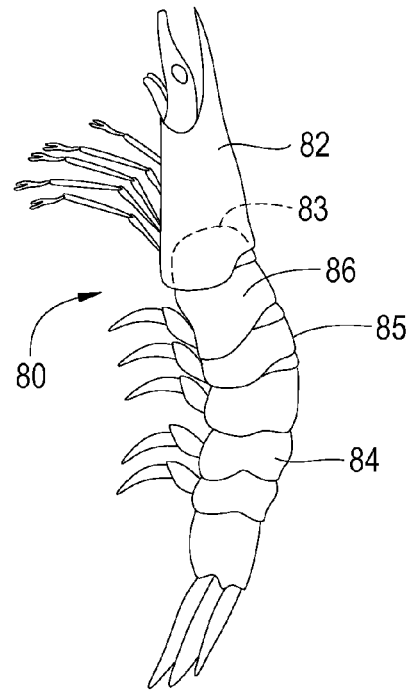
FIG. 11 is an elevation view of a typical shrimp suitable for processing in the present invention.

Turning to FIG. 11, therein is shown a typical shrimp 80, shrimp head 82, extra body meat or picon 83, tail portion 84, dorsal side 85 and sixth thoracic section 86. The tail portion 84 generally refers to everything from the picon 83 back to the actual end of the tail 84 of the shrimp 80.

In operation, the mating cutting blades 48, 50 are mounted on the lower ends of mirror image plates 56, 58 so that the notch 52, 54 of the blades capture the shrimp just in front of the sixth thoracic section to sever the head from the tail portion of the shrimp in such a way as to save and preserve the portion of meat known as the "picon", shown at 83, FIG. 11, which saves an additional approximate 10% of meat. The "picon" 83 is a small piece of neck meat which would be located on the front of the sixth thoracic section 86 of the shrimp 80 extending into the rear of the head 82 of the shrimp as shown in FIG. 11. The plate 56, 58 operate simultaneously on parallel bars 60, 62 using a pair of push-pull pneumatic air cylinders (not shown) having an open position and a closed position wherein the bars are normally open. The blades 48, 50 are disposed approximately on 3" centers although it is believed that other size spacing can be used. The parallel bars 60, 62 are mounted on the rotary swing axle 46 having bearing blocks 76 on each end which are operated by a swing cylinder. After the shrimp are captured in the head clamping mechanism the plates 56, 58 having the blades 48, 50 mounted thereon are rotated by the swing axle 46 toward the rear of the deheading assembly so as to remove the heads from the shrimp and then the heads of the shrimp fall into the head exit plate 70 and thereafter into a receptacle for disposal. After the heads are removed, water jets (not shown) spray water into the grooves 18 so as to wash the tails into the tail exit trough 72 and then to the side of the mechanism.

In operation, the steps are summarized as follows: (1) the plurality of shrimp are queued in the selected position in groove 18; (2) the head clamp bar 22 moves downwardly to capture the shrimp; (3) the cutting or severing blades 48, 50 close; (4) the cutting blades 48, 50 rotate to the rear to remove or sever the head; (5) the cutting blades 48, 50 open; (6) water jets spray water into the grooves 18 to remove tails. The operational cycle of the present invention is approximately three seconds and a plurality of shrimp depending on the number of grooves and number of cutting blades can be deheaded in one cycle. Also, the width of the grooves can be varied depending on the design parameters of the operator.

The electrical components of the present invention use 110 volts AC and operate on 24 volt DC. An Allen-Bradley sequential controller having six outputs is used in order to operate the present invention.

I claim:

1. An apparatus for deheading shrimp, the shrimp having a head portion, a tail portion, a body portion having a sixth thoracic section, and a dorsal side comprising:
   a) an entrance groove having a plurality of shrimp disposed therein, wherein the shrimp are queued one after the other, wherein the shrimp are oriented in a head forward orientation, wherein shrimp enter said front of said deheading station by being moved along said entrance groove, the entrance groove having an outlet from an end portion of said entrance groove, said entrance groove sloping downwardly to said outlet;
   b) a stop bar disposed adjacent and spaced from said outlet of said end portion of said entrance groove, wherein the shrimp is stopped by said stop bar in a user selected position in the said entrance groove;
   c) a head clamp bar disposed adjacent and above said outlet of end portion of said entrance groove having fingers for capturing each shrimp stopped by said stop bar;
   d) a swing assembly comprising first and second severing blades each having a half-moon notch facing each other reciprocating laterally in opposite directions to each other disposed between said stop bar and said head clamp bar for coming together to trap the head of each shrimp in a hole formed by said notches, said stop bar being mounted on said swing assembly;
   e) said swing assembly including a rotatable axle for rotating back and forth to drive operation of said reciprocating severing blades; and
   f) means for pivoting said swine assembly such that said stop bar and blades with a head of a shrimp trapped therebetween are moved away from said outlet to allow a remaining body portion of said shrimp to drop out of said entrance groove and fall onto to a tail exit trough, said trapped head of said shrimp being released onto a head exit plate upon separation of said blades, said remaining body portion including a picon which had been extending into said head of the shrimp from the sixth thoracic section thereof.

2. The apparatus of claim 1, further comprising means for adjusting said stop bar whereby said stop bar can be moved closer to said end portion of said entrance groove and away from said end portion of said entrance groove.

3. The apparatus of claim 2, wherein said means for adjusting said stop bar comprises a rack and pinion gear assembly configured for connection to said stop bar so that the stop bar can be adjusted relative to said end portion of said entrance groove.

4. The apparatus of claim 1, wherein said each finger on said head clamp bar further comprises a tip thereon, wherein said tip contacts the shrimp so that said tip is disposed just in front of said sixth thoracic section of said shrimp.

5. The apparatus of claim 4, further comprising means for moving said head clamp bar in substantially a vertical direction toward the shrimp and away from the shrimp.

6. The apparatus of claim 1, further comprising means for reciprocating said first and second severing blades with respect to each other, wherein said first ad second severing blades each contact opposite side surfaces of the head of the shrimp.

7. The apparatus of claim 6, wherein said means for reciprocating said first and second severing blades comprise:
 a) first and second parallel bars, wherein each said first and second parallel bar is adapted for connection to said rotatable axle;
 b) a first plate adapted for connection to said first and second parallel bar and a second plate adapted for connection to said first and second parallel bar;
 c) said first severing blade being disposed on said first plate and said second severing blade being disposed on said second plate;
 d) wherein said first plate is adapted for connection to a first actuating element and said second plate is adapted for connection to a second actuating element; and,
 e) wherein said first and second severing blades an reciprocated relative to each other by said first and second actuating elements.

8. A method for deheading shrimp, the shrimp having a head portion, a tail portion, a body portion having a sixth thoracic section, and a dorsal side, comprising the steps of:
 a) providing an entrance groove having a plurality of shrimp disposed therein, wherein the shrimp are queued one after the other, wherein the shrimp are oriented in a head forward orientation, wherein shrimp enter the front of the deheading station by being moved along the entrance groove, the entrance groove having an outlet from an end portion thereon, said entrance groove sloping downwardly to said outlet;
 b) providing a stop bar disposed adjacent and spaced from said outlet of the end portion of the entrance grooves, wherein the shrimp is stopped by the stop bar in a user selected the position in the entrance groove;
 c) providing a head clamp bar disposed adjacent the and portion of the entrance groove for capturing each shrimp stopped by said top bar;
 d) providing a swing assembly having first and second severing blades reciprocating laterally in opposite directions to each other disposed between the stop bar and the head clamp bar, wherein the head of each shrimp is captured by each severing blade as the blades come together, said swing assembly including said stop bar; and,
 e) pivoting said swing assembly such that said head is separated from said thoracic section of said shrimp by swinging said severing blades with the head clamped in between said severing blades away from said thoracic section, a picon remaining with said thoracic section, said picon had been extending into said head of the shrimp, said stop bar moving away along with said severing blades.

9. The method of claim 8, in which each severing blade has a half-moon notch facing each other to accommodate said head during clamping.

10. The method of claim 9, adjusting the stop bar so that the stop bar can be moved closer to the end portion of the entrance groove and away from the end portion of the entrance groove.

11. The method of claim 10, providing a rack and pinion gear assembly configured for connection to the stop bar so that the stop bar can be adjusted relative to the end portion of the entrance groove.

12. The method of claim 8, providing a finger having a tip therein wherein the tip contacts the shrimp so that the tip is disposed just in front of the sixth thoracic section of the shrimp.

13. The method of claim 12, moving the head clamp bar in substantially a vertical direction toward the shrimp and away from the shrimp.

14. The method of claim 8, reciprocating the first and second severing blades with respect to each other, wherein the first and second severing blades each contact opposite side surfaces of the head of the shrimp.

15. The method of claim 14, wherein each notch of each first and second severing blade contacts opposite side surfaces of the head of the shrimp.

16. The method of claim 14, wherein reciprocating the first and second severing blades, comprises the steps of:
 a) providing first and second parallel bars, wherein the first and second parallel bar is adapted for connection to the rotatable axle;
 b) providing a first plate adapted for connection to the first and second parallel bar and providing a second plate for connection to the first and second parallel bar;
 c) wherein the first severing blade is disposed on the first plate and the second severing blade is disposed on the second plate;
 d) wherein the first plate is adapted for connection to a second actuable element and the second plate is adapted for connection to a third actuable element; and,
 e) wherein the first and second severing blades are reciprocated relative to each other by the second and third actuable elements.

* * * * *